(No Model.)

J. A. MATHIEU.
CUSPIDOR.

No. 265,122. Patented Sept. 26, 1882.

Witnesses
George H. Carlile
Edwin Sweetser

Inventor
Jean A. Mathieu

UNITED STATES PATENT OFFICE.

JEAN A. MATHIEU, OF PORT LEYDEN, NEW YORK.

CUSPIDOR.

SPECIFICATION forming part of Letters Patent No. 265,122, dated September 26, 1882.

Application filed March 16, 1882. (No model.)

*To all whom it may concern:*

Be it known that I, JEAN A. MATHIEU, of Port Leyden, in the county of Lewis and State of New York, have invented a new and useful Improvement in Cuspidors, of which the following is a specification.

Figure 2:
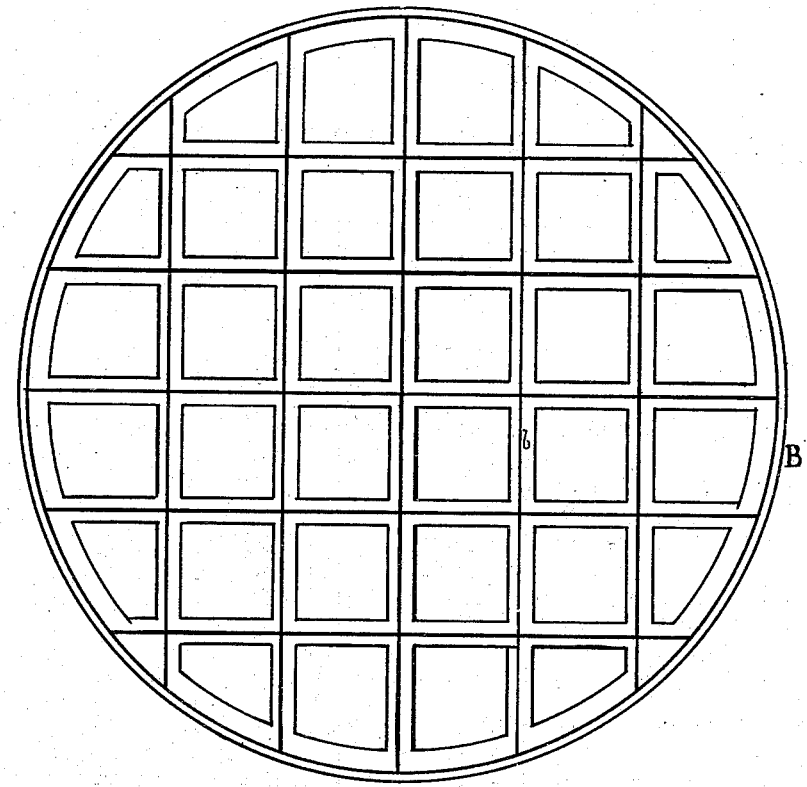
Figure 1:
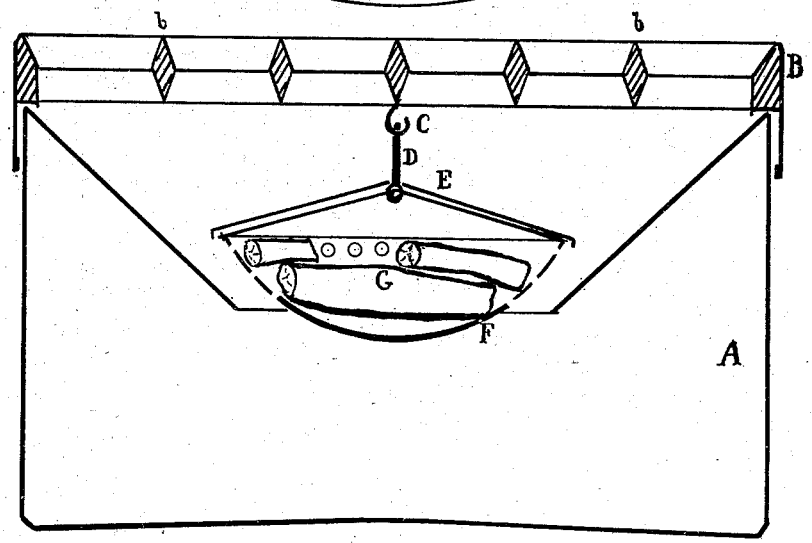

Figure 1 is a vertical section, and Fig. 2 is a top view, of my invention.

My invention consists, first, in placing over a cuspidor a grating or netting adapted to partially conceal from sight the contents of the cuspidor; second, in suspending in the mouth of a cuspidor a receptacle adapted to hold a disinfectant.

A represents a cuspidor.

B represents a grating or wire-cloth netting, of which $b$ $b$ are the bars or wires, adapted to fit the top of the cuspidor. The spaces between the bars or wires $b$ $b$ are small enough to partially conceal the contents of the cuspidor, and the grating is provided with a flange or lip on its lower side to fit over the upper edge of the cuspidor.

F is a cup, having perforated sides, hung from grating B by rod D and hook C.

E is a cover for cup F, sliding vertically on rod D, and prevents saliva or ashes from falling into cup F.

G represents any absorbent or disinfectant material placed in cup F.

The grating B, by partially concealing the contents of the cuspidor, renders it more sightly, while the disinfectant in cup F acts on the contents of the cuspidor and upon the room in which the latter is placed.

What I claim as my invention, and desire to secure by Letters Patent, is—

1. A cuspidor having over its top a grating or netting adapted to partially conceal its contents, substantially as shown and described.

2. A cuspidor in whose mouth is suspended a receptacle for an absorbent or disinfectant, substantially as herein shown and described.

3. The combination of the cuspidor A, grating B, having bars $b$ $b$, and cup F, suspended from grating B, substantially as herein shown and described.

4. The combination of the cuspidor A, cup F, suspended in the mouth thereof, and disinfectant G, as and for the purposes set forth.

JEAN A. MATHIEU.

Witnesses:
EDWARD A. GOTT,
GEO. H. LOTHROP.